Jan. 29, 1957     I. H. GERKS     2,779,869
AMPLITUDE DISTRIBUTION ANALYZER
Filed July 20, 1953     4 Sheets-Sheet 1
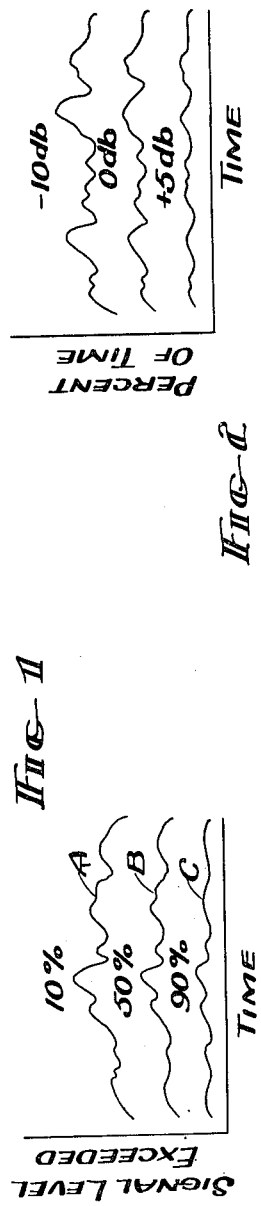
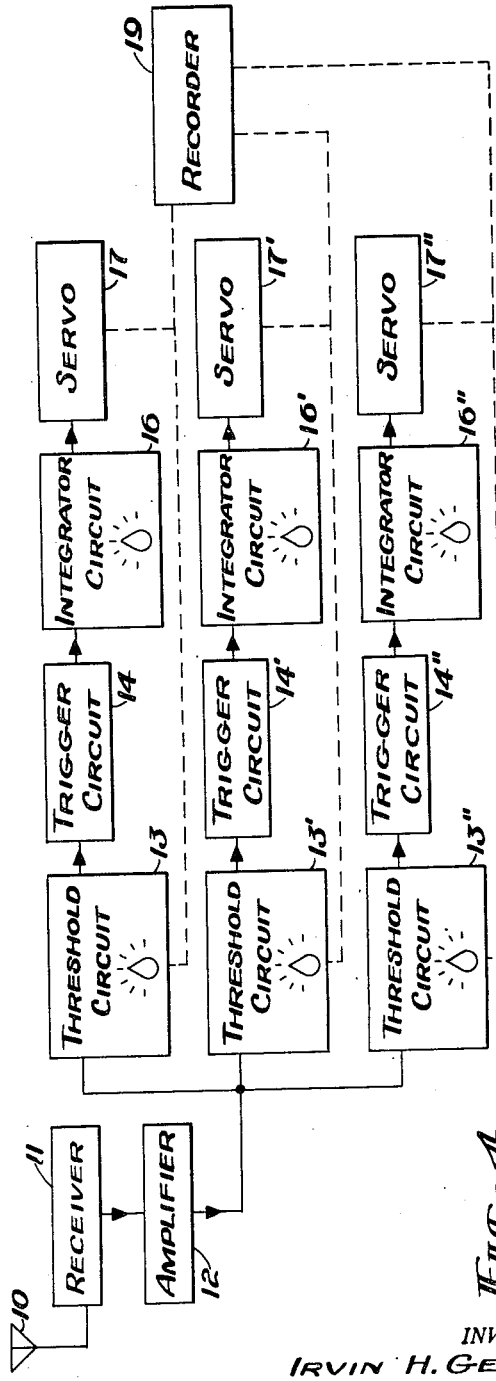
INVENTOR.
IRVIN H. GERKS
BY
*Marvin Moody*
ATTORNEY

INVENTOR.
IRVIN H. GERKS
BY
ATTORNEY

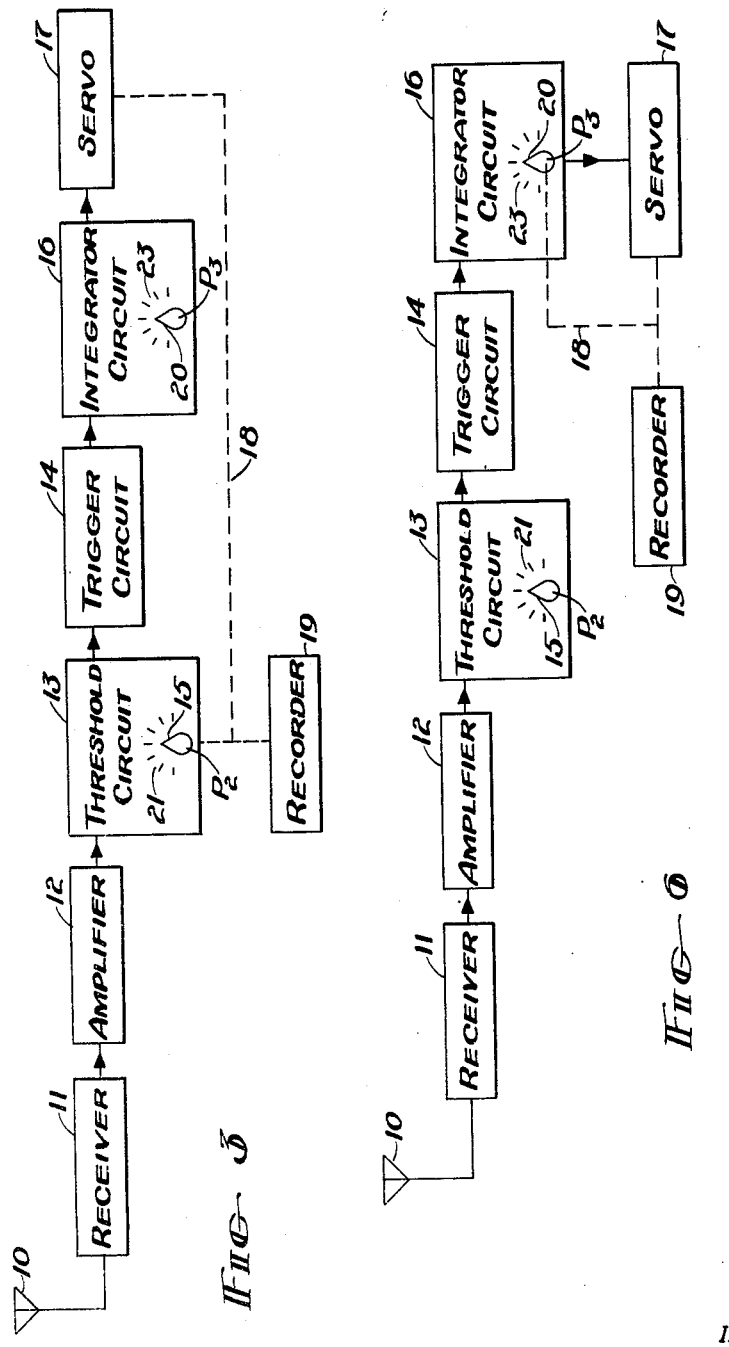

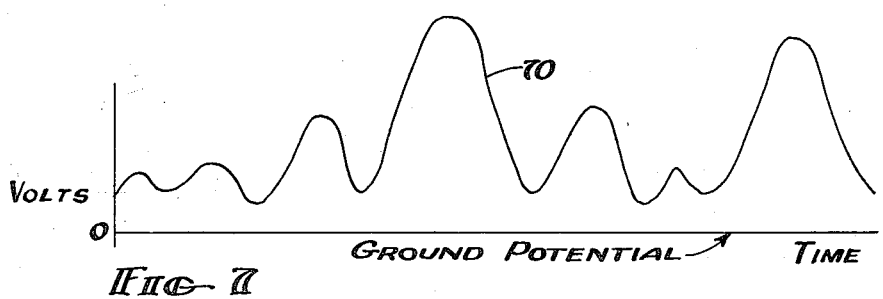
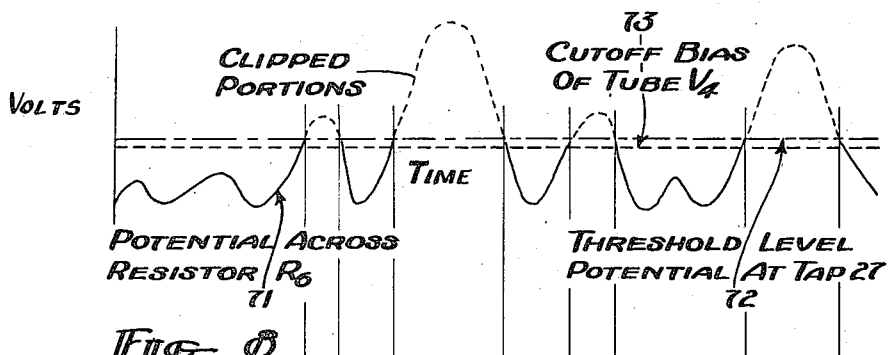
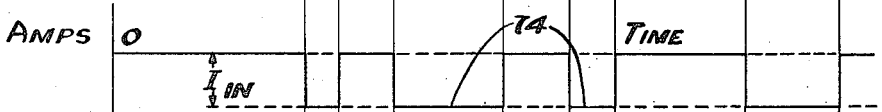
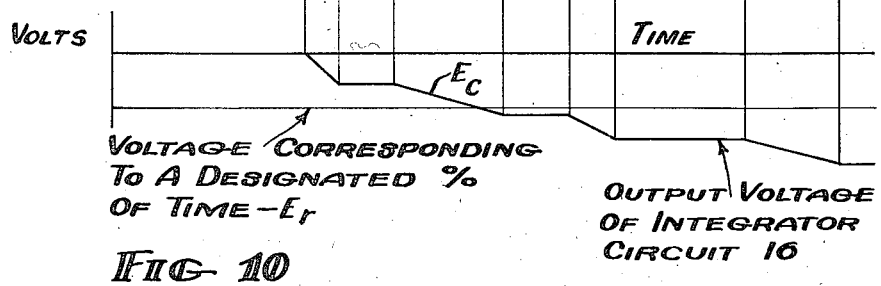

United States Patent Office 2,779,869
Patented Jan. 29, 1957

2,779,869

AMPLITUDE DISTRIBUTION ANALYZER

Irvin H. Gerks, Cedar Rapids, Iowa, assignor to Collins Radio Company, Cedar Rapids, Iowa, a corporation of Iowa Application July 20, 1953, Serial No. 368,923

12 Claims. (Cl. 250—20)

This invention relates generally to amplitude distribution analyzers and in particular to an automatic means for determining the statistical distribution of random amplitude variation.

Previous methods used to statistically determine the amplitude distribution of an electronic wave which had unpredictable amplitude variation involved large amounts of labor and time. The data obtained by prior methods required lengthy conversion and interpolation before the results could be placed in a final usable form. It is the principal object of this invention to provide an electronic device which will automatically and immediately produce the data in the final required form.

Amplitude distribution analysis generally involves the determination of what amplitude is exceeded a given percentage of time and involves three variables: Amplitude exceeded, time and percentage of time. Amplitude exceeded is generally called signal level exceeded and is usually expressed in decibels but may be also be expressed in volts or microvolts. Time is usually expressed in days, hours and very small fractions of an hour. Percentage of time has no units since it is a ratio.

As in all cases where three variables must be expressed in two dimentional graph form, it is necessary to assign arbitrary constant values to one variable while the other two are continuously varied to form a series of curves. The most useful analytical form for the above variables has been found to be that shown in Figure 1 in which percentage of time is held constant at arbitrarily designated values while signal level exceeded and time are varied. A graph in this form then indicates the amplitude or signal level that is exceeded a designated percentage of time as a function of time. For a detailed explanation of amplitude distribution analysis, see an article by the inventor which is published in the November 1951 issue of the "Proceedings of the Institute of Radio Engineers" entitled, "Propagation at 412 Megacycles from a High-Power Transmitter."

It is therefore another object of this invention to provide automatic means for indicating those signal levels which are exceeded a designated percentage of time as a function of time.

A previous means used in amplitude distribution analysis is set out in an article in the November 1951 issue of the "Proceedings of the Institute of Radio Engineers" entitled, "Notes on the Analysis of Radio-Propagation Data" by R. P. Decker. Briefly, this previous method used a series of thyratron circuits which controlled relay operated synchronous motor time counters. Each thyratron circuit was set to be actuated at a different signal level and actuated a time counter during the intervals that the designated signal level was exceeded. The counter of each circuit indicated the total amount of time that its designated signal level was exceeded to a tenth of a minute and was automatically photographed every hour. The data was taken from the film. Subtractions were required to obtain the time that each signal level was exceeded during each hour. A graph, as shown in Figure 2, could then be plotted with this data which shows signal level exceeded as the constant quantity. Since the desired presentation required percent of time as the constant quantity as shown in Figure 1, a great deal of tedious calculation, time and labor was required for the transformation.

Radio signals received with the aid of tropospheric refraction vary greatly from instant to instant and may at times fluctuate many thousand times a second. Prior relay operated synchronous motor driven apparatus does not properly respond to signals that fluctuate above the designated signal level more than approximately once a second. It is therefore still another object of this invention to provide an amplitude distribution analyzer which accurately responds to a very large number of signal fluctuations per second.

This invention consists of: A direct current amplifier which receives and amplifies a detected varying amplitude signal; a threshold circuit which responds to signal amplitudes above an automatically adjusted level, a trigger circuit which provides a constant current output during periods that the threshold circuit responds to an exceeded signal level, an integrator circuit that integrates the trigger circuit output to produce a voltage which is proportional to the percentage of time that the incoming signal exceeds the automatically adjusted signal level of the threshold circuit, a potentiometer connected to the integrator circuit which produces a reference voltage that corresponds to a designated percentage of time and is compared with the integrator circuit output to produce an error signal, and a servo system that responds to the error signal to regulate the threshold circuit.

Further advantages, objects and features of this invention will become apparent to a person skilled in the art upon a further study of this specification and these drawings, in which:

Figure 1 is a graph of signal level exceeded versus time with arbitrarity designated percentages of time maintained constant.

Figure 2 is a graph of percentage of time versus time with arbitrarily designated signal levels exceeded maintained constant;

Figure 3 is a block diagram of this invention which indicates signal levels exceeded for a single arbitrarily designated percentage of time;

Figure 4 is a block diagram of this invention which indicates the signal levels exceeded for a plurality of arbitrarily designated percentages of time;

Figure 6 shows a block diagram of another form of this invention which indicates the percent of time that a designated signal level is exceeded;

Figure 7 shows an example of how a detected signal voltage may vary with time;

Figure 8 shows the form of the output voltage of the threshold circuit of this invention when it receives the detected signal shown in Figure 7;

Figure 9 shows the form of the current output from the trigger circuit in this invention when the voltage of Figure 8 is received; and Figure 10 shows the voltage output of the integrator circuit in this invention when it receives the current output shown in Figure 9.

Figure 5:
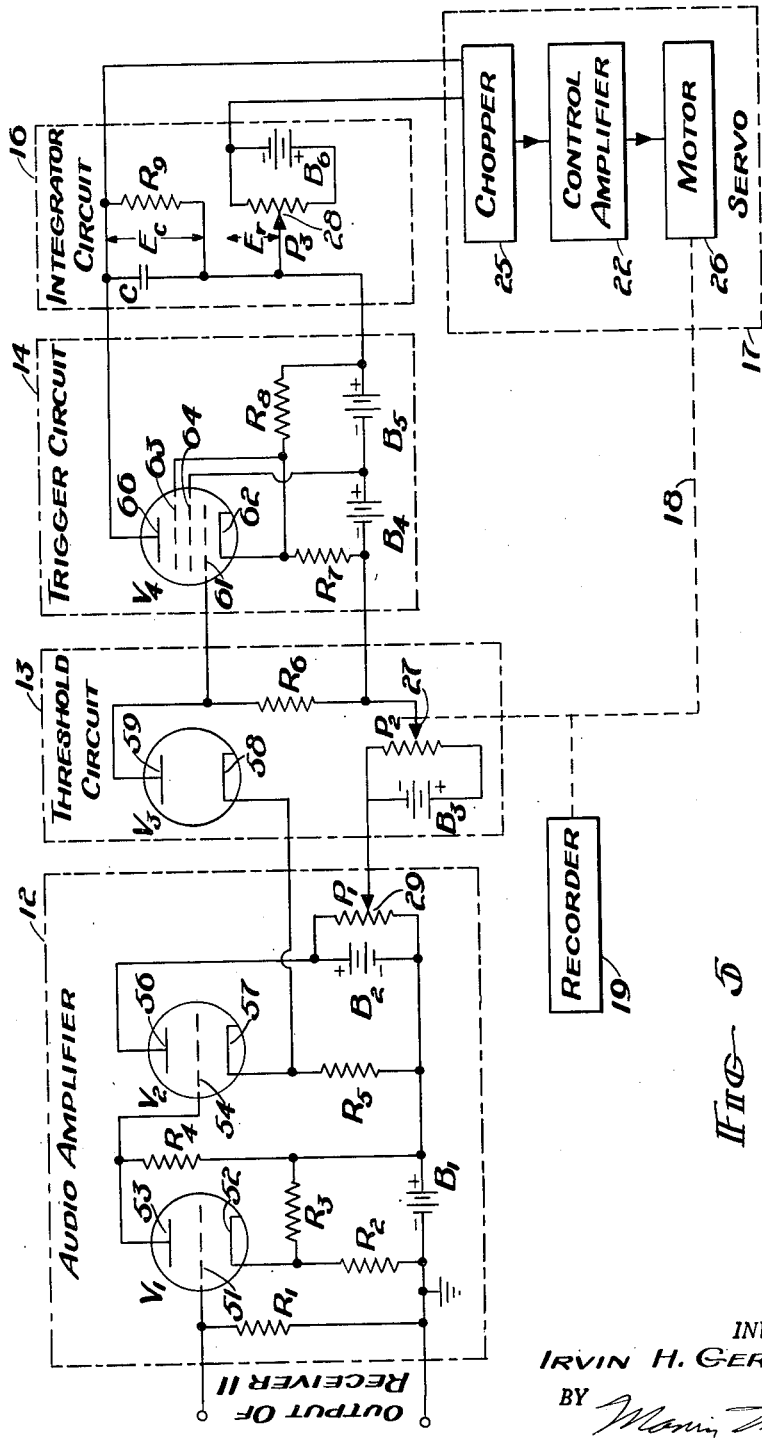
Figure 5 is a schematic diagram of one embodiment of this invention.

This invention is shown in block form in Figure 3 and has an antenna 10 which may be of any suitable type. A radio frequency receiver 11 of conventional type amplifies and detects a selected radio frequency signal.

An amplifier 12 is connected to receiver 11 and linearly amplifies the direct and alternating current components of the detected signal.

A threshold circuit 13 is connected to amplifier 12.

The threshold level is automatically adjusted by an input shaft 18.

A trigger circuit 14 is connected to the output of threshold circuit 13 and provides a constant current gate for each period that the input signal exceeds the threshold level setting of threshold circuit 13.

An integrator circuit 16 is connected to trigger circuit 14 and produces a voltage proportional to the per cent of time that the signal level setting of circuit 13 is exceeded. A potentiometer $P_3$ produces an adjustable reference voltage that corresponds to a particular per cent of time. A difference or error voltage is produced between outputs of integrator 16 and potentiometer $P_3$.

A servo 17 is connected to integrator circuit 16 and receives the error voltage. The output shaft 18 of servo 17 is coupled to potentiometer $P_2$ and controls the signal level setting of circuit 13. Servo 17 adjusts the signal level setting to provide zero error voltage. An indicator 15 is attached to shaft 18 and indicates on a calibrated scale 21 the instantaneous signal level exceeded which corresponds to the constant percentage of time setting of potentiometer $P_3$. A continuous recorder 19 is connected to shaft 18 and continuously shows the signal levels that are exceeded.

Since the apparatus of Figure 3 has only a single percentage of time setting at any one time, it is necessary to have a plurality of such apparatuses in order to simultaneously produce a number of curves which correspond to several arbitrarily selected percentages of time. Figure 4 shows a plurality of apparatuses of Figure 3 that use a common antenna 10, receiver 11, amplifier 12 and recorder 19 which would have a separate recording pen for each unit.

Figure 5 shows one detailed embodiment of the unit shown in Figure 3 without the antenna 10 and receiver 11. The output of receiver 11 is connected to the input of amplifier 12 which has a grid leak resistor $R_1$ connected between the control grid 51 of the tube $V_1$ and ground. A first voltage dividing resistor $R_2$ is connected between the cathode 52 of tube $V_1$ and ground, and a second voltage dividing resistor $R_3$ is connected between the cathode of tube $V_1$ and the positive terminal of an unidirectional voltage source $B_1$ which has its negative terminal grounded. A load resistor $R_4$ is connected between the plate 53 of tube $V_1$ and the positive terminal of voltage source $B_1$. A cathode follower tube $V_2$ has its control grid 54 connected to plate 53 of tube $V_1$. The plate 56 of tube $V_2$ is connected to the positive terminal of a unidirectional voltage source $B_2$, that has its negative terminal connected to the positive terminal of source $B_1$. A load resistor $R_5$ is connected between the cathode 57 of tube $V_2$ and the negative terminal of source $B_2$. A potentiometer $P_1$ has its opposite ends connected across source $B_2$. The output of amplifier 12 is taken between cathode 57 of tube $V_2$ and the tap 29 of potentiometer $P_1$.

Threshold circuit 13 receives the output of amplifier 12 and consists of a diode $V_3$ which has its cathode 58 connected to cathode 57 of tube $V_2$. A threshold selector potentiometer $P_2$ is connected across a unidirectional power source $B_3$ which has its negative terminal connected to tap 29 of potentiometer $P_1$. A load resistor $R_6$ is connected between the plate 59 of tube $V_3$ and the tap 27 of potentiometer $P_2$. The voltage taken across resistor $R_6$ furnishes the output of threshold circuit 13 which is fed to trigger circuit 14.

Trigger circuit 14 consists of a tube $V_4$ which has its control grid 61 connected to the plate 59 of tube $V_3$. The suppressor grid 63 is connected to cathode 62 and the screen grid 64 is connected to the positive terminal of a unidirectional voltage source $B_4$ which has its negative terminal connected to tap 27. A biasing resistor $R_7$ is connected between tap 27 and cathode 62 of tube $V_4$, and a resistor $R_8$ is connected between the cathode 62 of tube $V_4$ and the positive terminal of a unidirectional voltage source $B_5$ which has its negative terminal connected to the positive terminal of source $B_4$. The output of trigger circuit 14 is taken between the plate 66 of tube $V_4$ and the positive terminal of source $B_5$ and is applied to the input of integrator circuit 16.

Integrator circuit 16 consists of a resistor $R_9$ which is connected between the plate of tube $V_4$ and the positive terminal of source $B_5$. A capacitor C is connected in parallel with resistor $R_9$. A potentiometer $P_3$ is connected across a unidirectional voltage source $B_6$ and has its tap 28 connected to the positive terminal of source $B_5$. The output of integrator 16 is taken between the plate 66 of tube $V_4$ and the negative terminal of source $B_6$.

The servo 17 has its input connected to the output of integrator 16. Servo 17 is shown in Figure 5 in block form and has a chopper 25 which receives the error voltage from integrator 16 and changes it to an alternating voltage. A control amplifier 22 is connected to chopper 25 and controls the direction of rotation of a motor 26 that has an output shaft 18 which is coupled to tap 27 of potentiometer $P_2$ and to the pen of continuous recorder 19.

In operation, a radio frequency signal with fluctuating strength is received by antenna 10 and furnished to receiver 11 where it is selected, amplified and detected. The detected signal ordinarily has both direct and alternating voltage components which are then amplified by amplifier circuit 12 which equally amplifies all components from zero to approximately 10,000 cycles per second. It will be noted that amplifier 12 has no frequency sensitive capacitance or inductance components. The output of amplifier 12 is taken across cathode follower load resistor $R_5$. Tap 29 provides a voltage which cancels that voltage across resistor $R_5$ due to the static plate current of tube $V_2$ and the net output of amplifier 12 then is identical in form with the detected input voltage and is shown as voltage curve 70 in Figure 7. The input impedance of circuit 12 is very high while its output impedance is relatively low.

Threshold circuit 13 in Figure 5 is a peak clipper circuit. The clipping level is controlled by tap 27 of signal level selecting potentiometer $P_2$. The output of circuit 13 is taken across resistor $R_6$ and has negative polarity due to the polarization of tube $V_3$. When the input voltage reaches the signal level setting of tap 27, the plate current of tube $V_3$ becomes zero and clipping occurs. The output voltage across resistor $R_6$ then rises to zero for all input voltages that exceed the voltage setting of tap 27.

Curve 71 in Figure 8 shows the form of the voltage across resistor $R_6$ and dotted line 72 shows the voltage setting of tap 27 which is proportional to the signal level exceeded. The instances of zero output then correspond to the instances when the set signal level is exceeded since clipping only occurs while the set signal level is exceeded and the instances of negative output voltage then correspond to instances when the set signal level is not exceeded.

The control grid of pentode $V_4$ of trigger circuit 14 receives the output of threshold circuit 13 and is biased by the potential on cathode resistor $R_7$ to the point that a zero voltage across resistor $R_6$ raises the control voltage on tube $V_4$ slightly over cut-off. The resistors $R_7$ and $R_8$ across sources $B_4$ and $B_5$ form a voltage divider which can produce a finely controlled bias voltage. The dotted line 73 in Figure 8 corresponds to the cut-off voltage for tube $V_4$ and the dotted line 72 indicates the zero bias voltage obtained when a set signal level is exceeded. The transition from non-conduction to full conduction can be made to occur with a variation of less than one percent in the signal voltage. The magnitude of the plate current of tube $V_4$ during conduction can be controlled by adjustment of the voltage on screen grid 64. Pentode $V_4$ therefore provides plate current with a constant amplitude I during the instances of zero control voltage and provides no plate current during instances of negative control voltage. The plate current has the form of gates 74 shown in Figure 9 during instances when signal level 72 is exceeded.

Integrator circuit 16 receives plate current gates 74 and consists of the parallel combination of capacitor C and resistor $R_9$, which are chosen so as to have a relatively long time constant which might be made adjustable between, say, 10 seconds to 10 minutes. Condenser C is charged by the current gates 74 from tube $V_4$ and discharges through resistor $R_9$. The voltage across condenser C will be in equilibrium at a constant voltage $E_c$ when the amount of charge, conventionally designated by the symbol $q$, received from tube $V_4$ equals the amount of discharge through resistor $R_9$. This may be expressed by the relation:

$$q_{in} = q_{out} \qquad (1)$$

Since the current gates 74 have a constant amplitude I, the amount of charge $q_{in}$ received in any unit of time $t$ is:

$$q_{in} = \frac{P}{100} t I_{in} \qquad (2)$$

where P is the percent of time that current $I_{in}$ flows during time $t$. However, the charge is discharged by a current $I_{out}$ through resistor $R_9$ which is:

$$I_{out} = \frac{E_c}{R_9} \qquad (3)$$

and during equilibrium:

$$q_{out} = t I_{out} \qquad (4)$$

Substituting 2 and 4 in 1 we obtain:

$$\frac{P}{100} t I_{in} = t I_{out} \qquad (5)$$

and after dividing through by $t$:

$$\frac{P}{100} I_{in} = I_{out} \qquad (6)$$

then substituting 3 in 6 we obtain:

$$\frac{P}{100} I_{in} = \frac{E_c}{R_9} \qquad (7)$$

Since both $I_{in}$ and $R_9$ are constant, it follows from Equation 7 that P (percentage of time that a signal exceeds a designated signal level) is directly proportional to $E_c$ (voltage across condenser C). Voltage $E_c$ will be a maximum when current I flows 100 percent of the time. The percentage of time P that the signal level is exceeded is then $$\frac{E_c}{E_{c\,max}} \text{times } 100$$

All voltages of $E_c$ are then known which correspond to a certain percentage of time P.

An adjustable reference voltage $E_r$, which can be varied between voltages zero and $E_{c\,max}$, is obtained from the negative terminal of source $B_6$. A setting of voltage $E_r$ then corresponds to a designated percentage of time P and is selected by adjustment of tap 28 on potentiometer $P_3$. A scale 23 that is calibrated in percent is provided which indicates the setting of voltage $E_r$. Since the voltage $E_c$ has a negative polarity in circuit 16 of Figure 5, the reference voltage $E_r$ is taken from the negative terminal of source $B_6$.

In order to obtain the graph of Figure 1, it is necessary that percentage of time P remain constant while signal level exceeded is varied in such manner as to maintain P constant.

When the voltage $E_c$ is different from voltage $E_r$ there will be a difference or error voltage which is fed to chopper 25 of servo 17. Servo 17 then rotates shaft 18 and tap 27 of potentiometer $P_2$ in such manner as to adjust the clipping level (signal level exceeded) to produce zero error voltage. The signal level exceeded which is indicated on scale 21 then corresponds to that constant percentage P indicated by indicator 20 on scale 23.

Scale 21 is calibrated in terms of the signal voltage received by antenna 10 and indicates the instantaneous value of signal level exceeded. The pen of a continuous recorder 19, which has a chart that moves at a constant speed, is also actuated by shaft 18 and produces a curve which has percentage of time as a constant with signal level exceeded and time as variables.

When a series of the units shown in Figure 3 are connected as shown in Figure 4, a graph as shown in Figure 1 is obtained with each unit producing a separate curve corresponding to a different designated percentage of time such as the percentages A, B and C shown.

This invention may also be made to produce a graph as shown in Figure 2 by disconnecting shaft 18 of the servo from threshold circuit 13 and by connecting the shaft 18 to potentiometer $P_3$ as shown in Figure 6. Signal level exceeded may then be set at a designated constant value and the pen of the recorder 19 will vary in proportion to variation in the magnitude of percentage of time.

This invention may be used to statistically measure the random amplitude of any type of periodic or aperiodic movement which is translated into a voltage variation. For example, it can be used to measure the amplitude distribution of the various types of noise, speech, music or even the distribution of wind velocities.

While the system, apparatus and circuits shown and described herein are fully capable of achieving the objects and providing the advantages hereinbefore stated, it will be realized by a person skilled in the art that they are capable of considerable modification without departure from the spirit of the invention. For this reason the invention is not meant to be limited to the forms shown and described but rather to the scope of the intended claims.

What is claimed is:

1. An amplitude distribution analyzer for analyzing a varying function wherein the analyzer indicates the amplitude which is exceeded by the function a designated percentage of time, comprising means for translating the varying function into an electrical signal that varies with the variations of the function, a first voltage source providing an output that is the voltage level to be exceeded by the signal, a threshold means cooperating with said first voltage source to provide a threshold output when the signal exceeds the voltage level, a trigger circuit connected to receive the threshold output and to provide a constant current output during the instances that a threshold output is received, an integrator circuit with a long time-constant receiving the output of said trigger circuit, the steady-state output of the integrator circuit having a value proportional to the percentage of time that the voltage level is exceeded, a second voltage source calibrated with the integrator circuit to provide a voltage that corresponds to a particular percentage of time, the outputs of said integrator circuit and second voltage source opposing each other to provide an error output, a servo system with its input connected to receive the error output, the output of the servo system connected to the first voltage source, and the signal level output of the first voltage source controlled by the servo so that a zero error output is always approached, whereby the servo output varies in a manner that provides an analysis of the varying function in terms proportional to amplitude exceeded by the function a given percentage of time.

2. An amplitude distribution analyzer for analyzing a randomly varying signal comprising, threshold means receiving the signal and passing only those parts of the signal that exceed a given level, means for adjusting the passing level of said threshold means, a trigger circuit connected to said threshold means for producing an output of square waves of constant amplitude having durations equal to the actuations of the threshold output, an integrator circuit connected to said trigger circuit to integrate its output, the output of said integrator circuit reaching a steady state value corresponding to the percentage of time that the threshold passing level is exceeded, a percentage of time circuit which is an adjustable unidirectional voltage source connected serially with opposing polarity to the output of the integrator circuit, servo control means with its input connected to receive the difference voltage between said integrator circuit and said percentage of time circuit, and the output of said servo means connected to the adjusting means of the threshold means to adjust the passing level of the signal, whereby the instantaneous setting of the threshold adjusting means provides an analysis that is proportional to the signal level that is exceeded the percentage of time set at the percentage of time circuit.

3. An amplitude distribution analyzer for a randomly varying signal comprising, threshold adjusting means providing a unidirectional output voltage calibrated in terms of signal level to be exceeded, a threshold circuit receiving the signal, the threshold circuit connected to and controlled by the threshold adjusting means to provide a threshold output only when the voltage from the threshold adjusting means is exceeded, a trigger circuit connected to the output of said threshold circuit to provide output signals of constant amplitude only during instances that the threshold output is received, an integrator circuit connected to said trigger circuit to integrate the trigger circuit output, the integrator circuit having a steady-state output proportional to the percentage of time that the threshold level is exceeded, a percentage of time circuit including a unidirectional voltage source calibrated with the integrator circuit in terms of percentage of time, the percentage of time circuit connected with opposite polarity to the integrator circuit, servo control means with its input connected to receive the difference between the outputs of said integrator circuit and said percentage of time circuit, the output of said servo means connected to control the threshold adjusting means, a continuous recorder having scribing means used on constantly moving graph paper, and the scribing means connected to the output shaft of said servo to illustrate on one graphical coordinate signal levels exceeded a designated percentage of time and to illustrate time on the other graphical coordinate.

4. An amplitude distribution analyzer for a randomly varying signal comprising, clipping means receiving the signal, means for controlling the clipping level of said clipping means, a trigger circuit providing a constant output current while it receives an output from the clipping means, a discharging integrator circuit connected to receive the output of said trigger circuit, the steady-state output of the integrator circuit being proportional to the fraction of a preceding period of time that the clipping level is exceeded, the preceding period of time depending on the rate of discharge of the integrator circuit, a fraction of time circuit consisting of an adjustable unidirectional voltage source, calibrated with the output of the integrator circuit and connected with opposing polarity to the output of the integrator circuit, a servo control means connected to receive the difference voltage between the outputs of said integrator circuit and said fraction of time circuit, and the output shaft of said servo means connected to said means for controlling the clipping level, whereby said clipping level is adjusted by said servo to a value proportional to the signal level that is exceeded the fraction of time set on said fraction of time circuit.

5. An amplitude distribution analyzer for analyzing the random variations in a radio signal comprising, an antenna, a receiver connected to said antenna to select and detect a desired radio frequency signal, a clipping circuit with an adjustable clipping level receiving and clipping the output of said receiver to provide an output only when the receiver output exceeds the set clipping level, a trigger circuit connected to the output of said clipping circuit to produce a constant current output when a clipped input is received, an integrator circuit connected to the trigger circuit to integrate the output of said trigger, said integrator circuit having internal resistance through which it slowly discharges to reach a steady-state value that corresponds to the fraction of a preceding period of time that the set clipping level is exceeded by the signal, an adjustable potentiometer connected serially to the integrator circuit to supply a unidirectional reference voltage of opposite polarity and calibrated with the integrator circuit in terms of fractions of time, servo control means with its input connected to receive the difference between said integrator circuit and the potentiometer outputs, and the output of said servo connected to said threshold adjusting means to control it, whereby the servo output varies proportionally to the signal level that is exceeded the fraction of time set on the potentiometer.

6. Amplitude analysis means for indicating the instantaneous signal level of a randomly varying signal that is exceeded a predetermined fraction of time comprising, means for receiving, detecting, and linearly amplifying the direct and alternating components of the detected signal, means for clipping the output of said receiving means, means for adjusting the clipping level of said clipping means, means for producing a constant-current gated output during intervals that the detected signal is being clipped by said clipping means, means for integrating the output of said constant-current means, said integrating means slowly discharging to reach a steady-state level proportional to the fraction of a preceding period of time that the set signal level is exceeded, said period of time being proportional to the rate of discharge of said integrating means, an adjustable unidirectional voltage source connected serially and with opposing polarity to the integrating means to provide a difference output, a servo system connected to receive the difference output, the output of said servo means connected to and controlling the means for adjusting the clipping level, and the output of said servo indicating by its variation the instantaneous signal level that is exceeded by the randomly varying signal the designated fraction of the time set by said adjustable voltage source.

7. Amplitude analyzer means for indicating the signal level of a randomly varying signal that is exceeded a predetermined fraction of time, comprising means for receiving and detecting the randomly varying signal, means linearly amplifying the direct and alternating components of the detected signal, clipping means connected to the output of said amplifier means for clipping the signal, adjusting means connected to he clipping means for adjusting the signal clipping level of said clipping means, gating means connected to the clipping means and producing a constant-amplitude gated output during intervals that the detected signal is being clipped by said clipping means, an integrator circuit comprising a capacitor connected in parallel with a resistor, said integrator circuit connected serially with said trigger circuit output and having a steady-state voltage proportional to the fraction of time that the set signal level is exceeded, a unidirectional voltage source connected serially and with opposing polarity to the integrator circuit to provide a difference error output, a servo system connected to receive the error output, the output of said servo means connected to the clipping level adjusting means, and indicating means connected to the output of said servo means to indicate the signal level that is exceeded by the randomly varying signal a fraction of a preceding period of time that is proportional to the time-constant of the integrator circuit.

8. An amplitude distribution analyzer for analyzing a varying function wherein the analyzer indicates the percentage of time that the function exceeds a designated amplitude level, comprising means for translating the varying function into an electrical signal that varies with variations in the function, a first voltage source providing an output that is the voltage level to be exceeded by the signal, threshold means cooperating with said first voltage source to provide a threshold output when the signal exceeds the voltage level, trigger circuit means connected to receive the threshold output and to provide a constant-current output during the instances that a threshold output is received, an integrator circuit with a long time-constant receiving the output of said trigger circuit, the steady-state output of the integrator circuit having a value proportional to the percentage of time that the set voltage level is exceeded, a second voltage source calibrated with the integrator circuit to provide a voltage that corresponds to percentage of time, the outputs of said integrator circuit and second voltage source opposing each other to provide an error output, a servo system receiving the error output, the output of said servo system connected to the second voltage source to control it, and the second voltage source adjusted by the servo so that a zero error output is always approached, whereby the servo output varies in a manner that provides an analysis of the varying function in terms proportional to the percentages of time that a given amplitude is exceeded by the function.

9. An amplitude distribution analyzer for indicating the percentage of time that a designated signal level is exceeded by a randomly varying signal comprising, threshold means receiving the randomly varying signal and passing only those parts of the signal that exceed a given amplitude level, means for adjusting the passing level of said threshold means, a trigger circuit connected to said threshold means for producing an output of square waves of constant amplitude having durations equal to the actuations of the threshold output, an integrator circuit connected to said trigger circuit to integrate its output, the output of said integrator circuit reaching a steady-state value corresponding to the percentage of time that the set threshold passing level is exceeded, a percentage of time circuit which is an adjustable unidirectional voltage source connected serially with opposing polarity to the output of the integrator circuit, servo control means with its input connected to receive the difference voltage between said integrator circuit and said percentage of time circuit, and the percentage of time circuit connected to and controlled by the output of said servo means, whereby the instantaneous setting of the percentage of time circuit is proportional to the percentage of time that a set threshold level is exceeded by the randomly varying signal.

10. An amplitude distribution analyzer for a randomly varying signal to indicate the percentage of time that a designated signal level is exceeded, comprising threshold adjusting means providing a unidirectional output voltage calibrated in terms of signal level to be exceeded, a threshold circuit receiving the signal, the threshold circuit connected to and controlled by the threshold adjusting means to provide a threshold output only when the output from the threshold adjusting means is exceeded, a trigger circuit connected to the output of said threshold circuit to provide output signals of constant amplitude only during instances that the threshold output is received, an integrator circuit connected to said trigger circuit to integrate the trigger circuit output, the integrator circuit having a steady-state output proportional to the percentage of time that the threshold level is exceeded, a percentage of time circuit including a unidirectional voltage source calibrated with the integrator circuit in terms of percentage of time, the percentage of time circuit connected with opposite polarity to the integrator circuit, servo control means with its input connected to receive the difference between the outputs of said integrator circuit and said percentage of time circuit, the output of said servo means connected to control the output voltage provided by the percentage of time circuit, a continuous recorder having scribing means used on constantly moving paper, and the scribing means connected to the output shaft of said servo to illustrate on one graphical coordinate the percentages of time that the random signal exceeds a designated signal level and to illustrate time on the other coordinate.

11. An amplitude distribution analyzer for indicating the fraction of time that a particular amplitude level is exceeded by a varying signal, comprising clipping means receiving the signal, means for controlling the clipping level of said clipping means, a trigger circuit connected to said clipping means and providing a constant output current while it receives an instantaneous output from the clipping means, a discharging integrator circuit connected to receive the output of said trigger circuit, the steady-state output of the integrator circuit being proportional to the fraction of a preceding period of time that the clipping level is exceeded, the preceding period of time depending on the rate of discharge of the integrator circuit, a fraction of time circuit consisting of an adjustable unidirectional voltage source calibrated with the output of the integrator circuit and connected with opposing polarity to the output of the integrator circuit, a servo control means connected to receive the difference voltage between the outputs of said integrator circuit and said fraction of time circuit, and the output shaft of said servo means connected to said fraction of time circuit for controlling the fraction of time output level, whereby said fraction of time output level is adjusted by the servo to a value proportional to the fraction of time that the signal exceeds a designated signal level set on the clipping level control means.

12. Amplitude analysis means for indicating the instantaneous fraction of time that a randomly varying signal exceeds a predetermined signal level comprising, means receiving and detecting the randomly varying signal, means linearly amplifying the alternating and direct components of the detected signal, clipping means connected to the output of said amplifying means for clipping the signal, adjusting means connected to the clipping means for adjusting the signal clipping level, gating means connected to the clipping means and producing a constant-amplitude gated output during intervals that the detected signal is being clipped by said clipping means, an integrator circuit comprising a capacitor and resistor connected in parallel, said integrator circuit connected serially with the output of said trigger circuit and having a steady-state voltage proportional to the fraction of time that the set signal level is exceeded, a unidirectional voltage source connected serially with opposite polarity to said integrator circuit to provide a difference output, a servo system connected to receive the difference output, the output of said servo means connected to control said unidirectional voltage source to control its fraction of time output, and the output of said servo means indicating the fraction of an immediately preceding period of time that the randomly varying signal exceeds the set signal level with said period of time being proportional to the time-constant of the integrator circuit.

References Cited in the file of this patent
UNITED STATES PATENTS

| | | |
|---|---|---|
| 2,498,676 | Grieg | Feb. 28, 1950 |
| 2,619,590 | Williams | Nov. 25, 1952 |
| 2,619,830 | Piety | Dec. 2, 1952 |